United States Patent
Qiao et al.

(10) Patent No.: US 6,950,782 B2
(45) Date of Patent: Sep. 27, 2005

(54) MODEL-BASED INTELLIGENT DIAGNOSTIC AGENT

(75) Inventors: Liu Qiao, Ann Arbor, MI (US); Masayuki Kawmamoto, Novi, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 64 days.

(21) Appl. No.: 10/629,035

(22) Filed: Jul. 28, 2003

(65) Prior Publication Data

US 2005/0027480 A1 Feb. 3, 2005

(51) Int. Cl.$^7$ .............................................. G06F 15/00
(52) U.S. Cl. ....................... 702/183; 702/183; 702/104; 702/58; 702/35; 73/658; 73/660; 324/555; 714/25; 700/29; 700/30; 700/31; 701/40; 701/59; 345/595; 345/621
(58) Field of Search ......................... 702/33–35, 58–59, 702/104, 113, 177, 182–183; 73/658, 660; 324/555; 714/25; 700/29, 30, 31; 701/59, 40; 345/595, 621

(56) References Cited

U.S. PATENT DOCUMENTS

| | | | | |
|---|---|---|---|---|
| 5,870,768 A | * | 2/1999 | Hekmatpour | ............ 715/501.1 |
| 6,012,152 A | * | 1/2000 | Douik et al. | ................... 714/26 |
| 6,108,616 A | * | 8/2000 | Borchers et al. | ............ 702/183 |
| 6,684,285 B2 | * | 1/2004 | Farmwald et al. | .......... 710/305 |

OTHER PUBLICATIONS

Weiss et al., 'Design and Implementation of a Real–Time Multi–Agent System', 1998, IEEE Article, pp. 1269–1273.*
Murphey et al., 'Automotive Fault Diagnosis:–Part II: A Distributed Agent Diagnoistic System', Jul. 2003, IEEE Article, vol.: 52, No. 4, pp. 1076–1098.*
IPM, 'Wireless Vehicle Interface' IPM Article, 2000, pp. 1–2.*

* cited by examiner

Primary Examiner—Marc S. Hoff
Assistant Examiner—Elias Desta
(74) Attorney, Agent, or Firm—Gifford, Krass, Groh, Sprinkle, Anderson & Citkowski, P.C.

(57) ABSTRACT

The present invention provides a multi-level model-based intelligent agent diagnosis system and method for computer-controlled machinery operative to reduce the complexity typically associated with conventional model based diagnostic systems. The system utilizes a plurality of intelligent agents arranged in a plurality of physically hierarchical layers such that the tasks associated with accomplishing model based diagnosis are distributed amongst the intelligent agents if each layer wherein information gathered from a first lower level intelligent agents is processed by at least one other higher level to realize system fault diagnosis. The system provides increased processing speed of modeling and/or model identification such that faster and more accurate failure isolation and identification is accomplished.

18 Claims, 4 Drawing Sheets

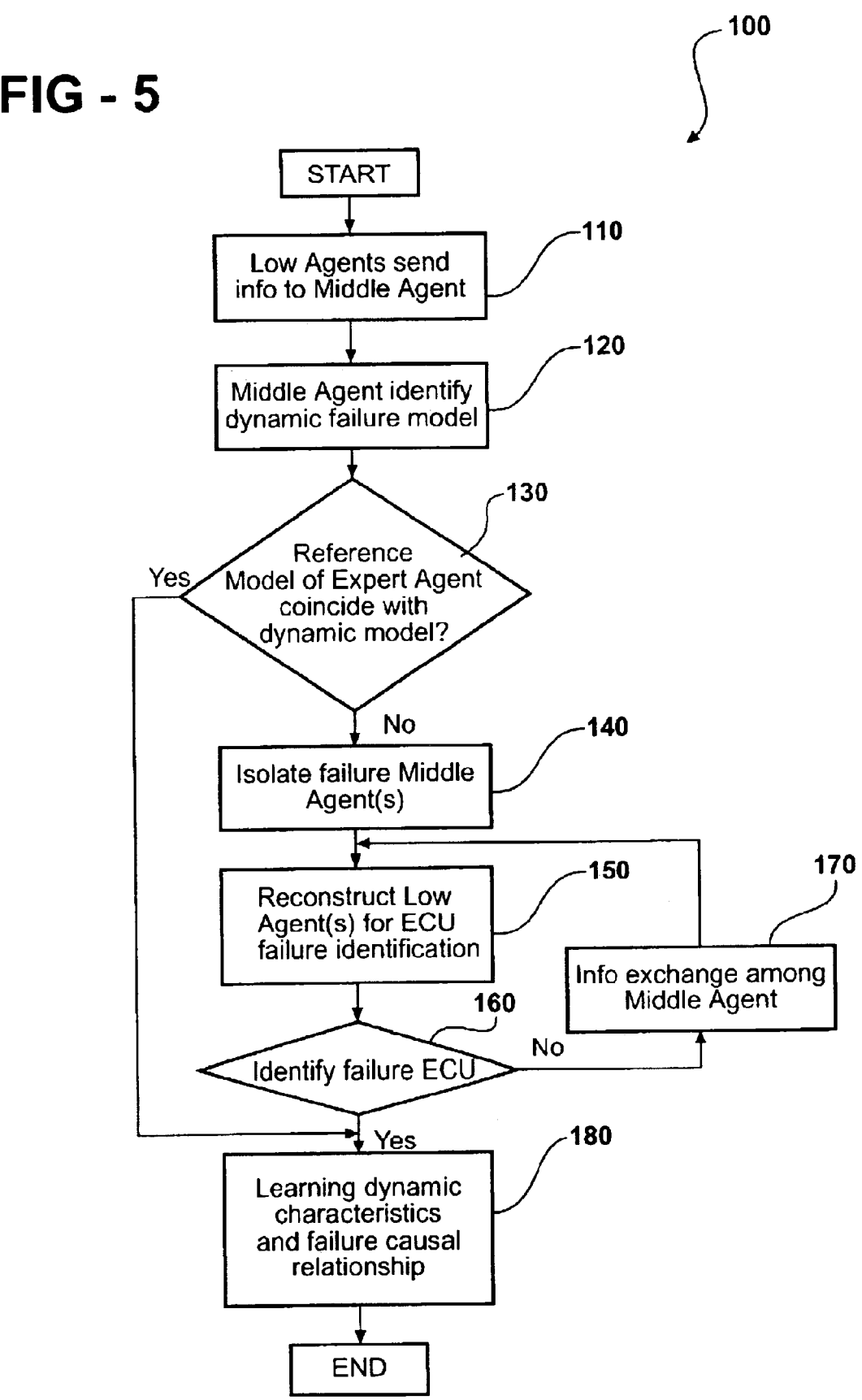

MODEL-BASED INTELLIGENT DIAGNOSTIC AGENT

FIELD OF THE INVENTION

The present invention relates to malfunction diagnosis systems for diagnosing malfunctions in electronically and/or computer-controlled machinery. More particularly, the invention relates to a method for diagnosing malfunctions in electronically controlled machinery by tasking one or more of intelligent agents disposed in the machinery to perform various diagnostic functions at various diagnostic levels to enhance diagnostic capability while reducing individual component diagnostic tasking while accomplishing accurate and reliable fault isolation and identification.

BACKGROUND OF THE INVENTION

The importance of diagnostic systems for computer-controlled machinery, such as motor vehicles, is constantly growing together with the complexity of the systems. Vehicle onboard diagnostic systems (OBD) were developed to help diagnose and service the computerized engine systems of today's vehicles. Despite the type of vehicles OBD systems are installed in, they all function to diagnose component malfunctions that occur in the critical or essential systems required for the vehicle's proper operation and maintaining compliance with government regulations such as the engine and emissions controller systems, respectively.

These systems commonly operate to detect a malfunction or component deterioration before the driver becomes aware of a problem. However, nearly all systems include a means of notifying the driver that a problem exists in one of the components whenever a deterioration condition reaches a critical level. This indication is usually provided in the form of a malfunction indicating light found in the instrument cluster of a vehicle. Once noticed, the vehicle user is alerted that the vehicle is in need of some form of repair and thus should be taken in for service.

Although conventional OBD systems are operative to diagnose malfunctions in a general sense, these systems do not have the capability to determine a root cause or isolate the fault. The repairperson is typically provided one or more fault codes by the OBD system that describes the malfunction but not its cause. Thus, the repairperson is left with the responsibility of fault isolation. In some cases this results in the vehicle owner being deprived of access to his vehicle for several days until proper repairs can be made. Accordingly, there exists a need for a diagnostic system of computer-controlled machinery that not only can detect and describe a malfunction but also perform reliable and accurate fault isolation.

SUMMARY OF THE INVENTION

The present invention provides a method of utilizing a multi-leveled, model-based intelligent agent diagnostic system for diagnosing malfunctions in computer controlled machinery to enhance diagnostic speed and accuracy in addition to providing reliable fault isolation.

The method comprises the steps of disposing a plurality of diagnostic intelligent agents including low, middle, and high level agents, in the computer-controlled machinery such that the agents are in data communication with the computer controllers of the machinery and with one another.

The next step involves employing at least one low level intelligent agent to perform a first level of diagnostic tasks on at least one computer controller of the machinery using reference information stored within the at least one low level intelligent agent and/or information received from a middle level intelligent agent to obtain a first level of diagnostic information.

The process continues by employing at least one middle level intelligent agent to perform a second level of diagnostic tasks using the first level of diagnostic information received from the at least one low level intelligent agent, reference information stored within the at least one middle level intelligent agent, and/or information received from a high level intelligent agent to obtain a second level of diagnostic information.

The last step involves employing at least one high level intelligent agent to perform a third level of diagnostic tasks using the second level of diagnostic information received from the at least one middle level intelligent agent wherein the third level of diagnostic tasks includes analyzing the information received from the at least one middle level intelligent agent relative to reference information stored within the at least one high level intelligent agent and/or human expert information obtained remotely through a wireless communications link to accomplish fault isolation within the computer controlled machinery.

It is appreciated that one or all of the above steps may be re-sequenced without departing from the scope of the invention. Additionally, the above described low, middle, and high level intelligent agents exemplify an embodiment of the concept and are not intended to act as a limitation as it is further appreciated that the inventive concept may be embodied in a single intelligent agent, a single level of intelligent agents, or a plurality of levels of intelligent agents.

BRIEF DESCRIPTION OF THE DRAWINGS

To further describe the nature and objects of the present invention, reference should be had to the following detailed description taken in conjunction with the accompanying drawings in which like parts are given like reference numerals and wherein:

FIG. 5 illustrates a flow chart of the general operation of the multi-level intelligent agent system as according to the invention.

DETAILED DESCRIPTION OF THE INVENTION

The present invention seeks to provide a multi-level intelligent agent diagnostic system that is operative to reduce the system complexity associated with traditional model-based diagnostic systems while enhancing system fault isolation capabilities.

Figure 1:
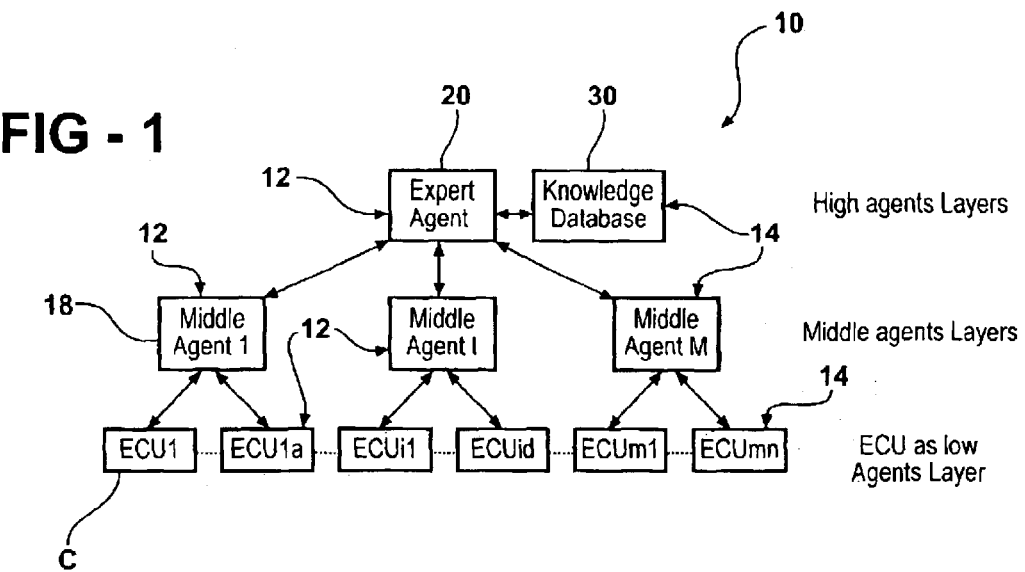
FIG. 1 is illustrative of a block structural diagram of the concept of the multi-level intelligent agent system.
Figure 2:
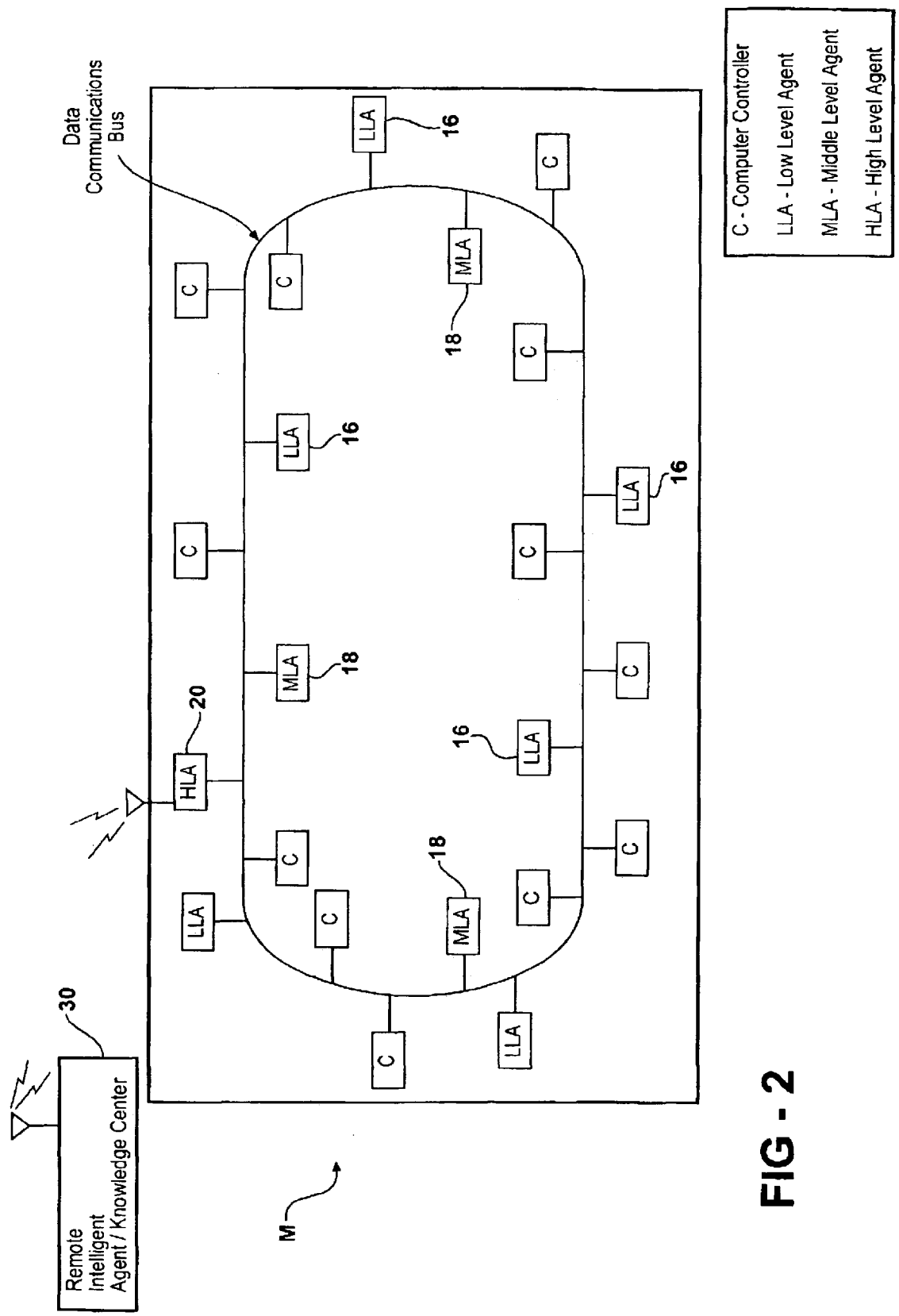
FIG. 2 illustrates a plurality of intelligent agents in data communication as according to the invention.

With reference to FIGS. 1 and 2, the concept and construction of the multi-level, model-based intelligent agent diagnostic system 10 is generally illustrated. The system architecture includes a plurality of intelligent agents 12 arranged in a plurality of hierarchical layers 14 whereby the agents 12 arranged in the lowest to highest physical layers may be described as low 16, middle 18, and high 20 level agents, respectively, and wherein the diagnostic and fault isolation capability of the intelligent agents 12 within the various layers 14 increases accordingly with transition to a higher physical layer.

It is appreciated that conventional computer controllers C collect data through various types of sensors wherein the data collected is analyzed and used to control the operation of the machinery M by making adjustments to various operating parameters or functions to bring them within desired limits. The data collected via sensors can also used by the inventive diagnostic intelligent agent system 10 for accomplishing general fault diagnosis and fault isolation as according to the invention. Accordingly, a computer controller may also function as a low level agent 16.

As such, intelligent agent 12 may be similar to a conventional electronic control unit generally having at least one microprocessor, memory, a plurality of I/Os, and operating software to facilitate the collection, storage and analysis of diagnostic information. An intelligent agent 12 may optionally be provided in the form of at least one Application Specific Integrated Circuit (ASIC) incorporated into a computer controller C. Accordingly, the system 10 may be comprised of a plurality of independent intelligent agents distributed throughout the machinery M or as a plurality of ASIC sub-circuits incorporated into existing computer controllers C. Accordingly, FIG. 1 illustrates a diagnostic system 10 as according to the invention that consists of middle and high level agents in communication with computer controllers having diagnostic sub-circuits therein that are operative to perform the diagnostic tasks that would be designated to an independent low level agent 16. Thus, the computer controllers may essentially be the low level agents 16.

Figure 3A:
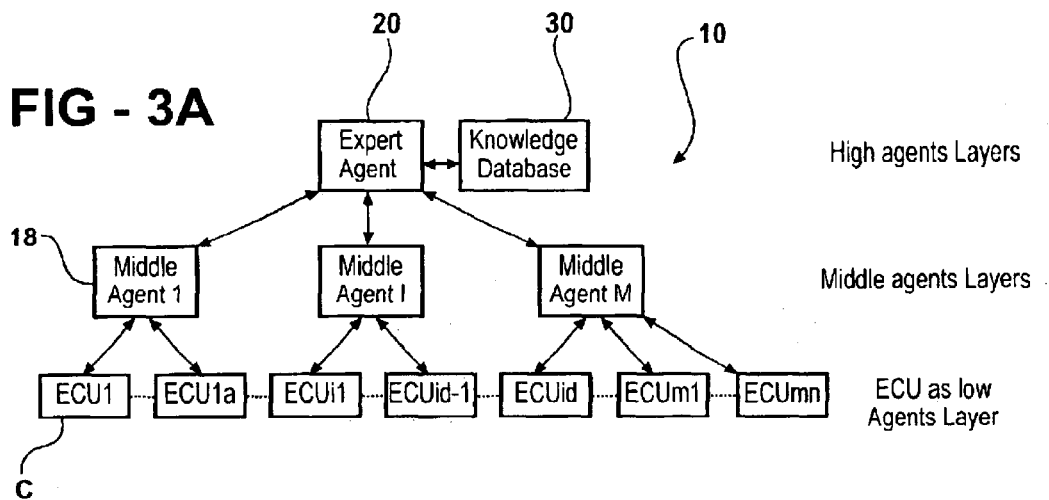
FIG. 3 illustrates an example of agent reorganization as according to the invention.
Figure 3B:
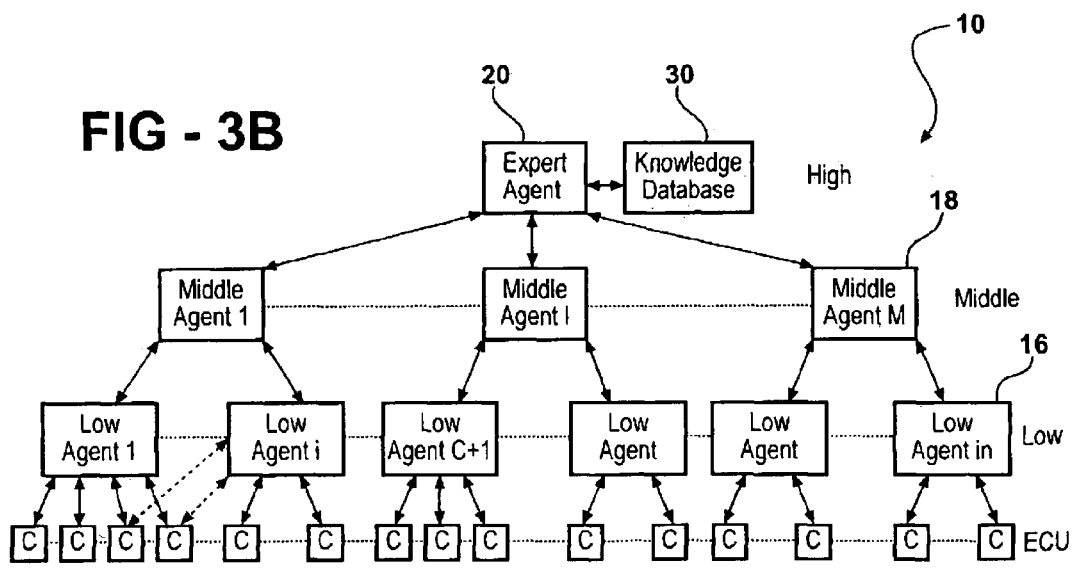

FIG. 3B illustrates a diagnostic system 10 wherein independent low-level agents 16 are provided between the computer controllers C and the middle level agents 18. The following description of the inventive diagnostic system 10 is done with respect to a system architecture that includes low, middle, and high level intelligent agents in communication with a plurality of computer controllers C of a machinery M as illustrated in FIG. 3B.

FIG. 2 exemplifies the manner in which a plurality of intelligent agents 12 may be disposed within a computer-controlled machinery M having a data communications bus or channel 22. As illustrated, each of the intelligent agents 12 is in data communication with each other as well as each computer controller C of the machinery via the data bus 22. In this manner, any particular intelligent agent 12 can be selectably made to communicate with any one or all of the computer controllers C and/or other intelligent agents 12. Communication is defined herein as receiving, transmitting and/or monitoring data traffic between any or all of the system components as well as the components of the computer controlled machinery M. It is appreciated that the data communications bus, and/or communications channel 22, between intelligent agents 12 and various computer controllers C may be wired or wireless without departing from the scope of the invention.

Preferably, the low level agents 16 are operative to perform a first level of diagnostic tasks, in relation to tasks performed by higher level intelligent agents 12, on the computer controlled machinery M. Illustratively, a low level agent 16 may be tasked to collect data from one or more computer controllers C and thereafter compare the collected data with stored data. If the collected data differs from the stored data beyond predetermined thresholds then the low level agent 16 will recognize and generate a fault code generally indicative of a type of malfunction. This fault code may thereafter be used as a first level of diagnostic information for fault isolation within the computer controlled machinery M.

Referring again to FIG. 3B, the middle agents 18 are operative to perform a second level of diagnostic tasks using: the first level of diagnostic information received from at least one low level intelligent agent 16; reference information stored within the middle level intelligent agent 18; and/or information received from a high level intelligent agent 20 to obtain a second level of diagnostic information.

Illustratively, a middle level agent 18 may be actively communicating with at least one low level agent 16 designated to perform diagnostic tasks and monitoring on an electrical subsystem within the machinery M wherein the electrical subsystem is made a plurality of computer controllers C. The low level agent 16 detects a fault in the subsystem and thereafter generates and transmits the first level of diagnostic information to the middle level agent 18.

The middle level agent 18 performs a second level of diagnostic tasks using the first level of diagnostic information. The second level of diagnostic tasks may include analyzing the first level of diagnostic information in relation to subsystem reference information stored within the middle level agent 18 to identify a failure model. An identified failure model may thereafter be compared to reference models stored in, or obtained by, a high level agent 20.

If the reference model of the high level agent 20 coincides with the failure model identified by the middle level agent 18 then the fault isolation process is effectively accomplished via the use of reference models and/or learned information. It is appreciated that the reference models and learned information may be derived from empirical testing, computer simulations, mathematical modeling, and data analysis for determining root cause or precision fault isolation within a computer controlled machinery M.

Additionally, the second level of diagnostic tasks may include a reorganization process wherein the middle level agent 18 operates to re-task at least one low level intelligent agent 16 to accomplish further fault isolation. This reorganization process may be employed by the diagnostic system 10 when a failure model identified by the middle level agent 18 does not coincide with the reference models or learned information of the diagnostic system 10.

Reorganization by a middle level agent 18 is illustratively described with reference to FIG. 3B wherein an electrical subsystem within a computer controlled machinery M having a number of computer controllers C may initially only be monitored by a single first low level agent-1 for diagnostic purposes. Once a fault is detected in the subsystem by the first low level agent-1, the middle level agent 18 may instruct a second low level agent-1 to join the first low level agent-1 in monitoring the computer controllers C of the subsystem such that each of the first and second low level agents monitor an equal number of computer controllers C within the subsystem.

The first and second agents then begin to perform diagnostic tasks on the respective computer controllers to determine where the fault exists within the divided subsystem of computer controllers C. In this manner, it is appreciated that middle level agent 18 accomplishes further fault isolation by reorganizing the low level agents 16 in relation to the computer controllers C of a malfunctioning subsystem such that the subsystem controllers are divided into smaller groups for diagnostic purposes until precision fault isolation is preferably realized to a single controller within the subsystem. Reorganization may be done electronically via a multiplex/de-multiplex circuit integrated between the plurality of intelligent agents, or via software operative to re-task intelligent agents to actively communicate with particular other intelligent agents.

Once the reorganization process has facilitated the isolation of a fault to a single computer controller within a subsystem, the middle level agent 18 may thereafter perform further diagnostic tasks using the first level of diagnostic information obtained by the low level agent 16 associated with the fault isolated computer controller C. The diagnostic tasks may include analyzing the first level of diagnostic information relative to reference information stored within the middle level agent, and/or relative to information obtained from a high level agent 20, to generate a second level of diagnostic information. The second level of diagnostic information is thereafter transmitted to a high level agent for further diagnosis toward accomplishing fault isolation.

Upon receiving the second level of diagnostic information from at least one middle agent 18, at least one high level intelligent agent 20 performs a third level of diagnostic tasks using the second level of diagnostic information wherein the third level of diagnostic tasks includes analyzing the second level of diagnostic information relative to reference information stored within the high level intelligent agent 20 and/or expert information obtained remotely through a wireless communications link with a central knowledge facility 30 to accomplish fault isolation within the computer controlled machinery M.

The central knowledge facility 30 may include databases of learned information from empirical testing, research, mathematical modeling and/or a human expert may receive and analyze information received from the high level agent and thereafter perform diagnostic fault isolation. Diagnostic analysis at the central knowledge facility 30 may include root cause analysis or fault isolation down to a single computer controller C and/or sensor level. The diagnostic information determined by the central knowledge facility 30 and/or human expert is transmitted back to the high-level agent 20 and thereafter learned and stored as a reference model/information for future diagnostic episodes.

The diagnostic system 10 may include a capability link to at least one fault indicator operative to alert a user of computer controlled machinery of a malfunction. The indicator may be provided in the form of a visual display such as an LED, CRT or LCD display, radio display, audio system via voice synthesis, audio alarms or the like. The fault indicator may be selectably activatable by a serviceperson during a service check to view malfunction history and/or current faults.

Figure 4:
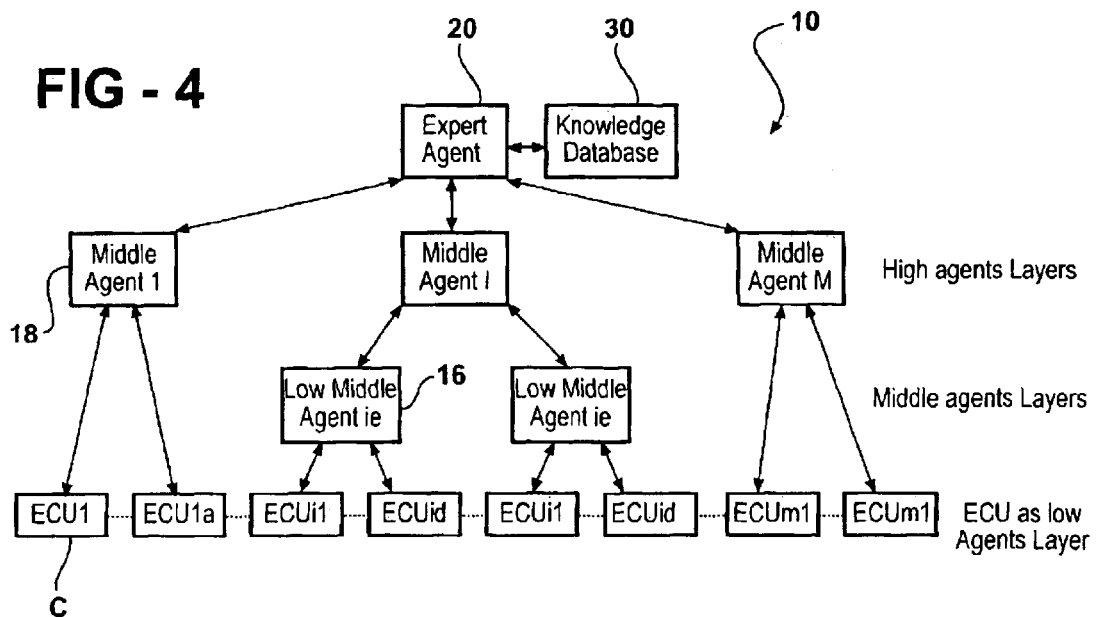
FIG. 4 illustrates an example of agent resegmentation as according to the invention.

Through precision fault isolation, the diagnostic system 10 according to the present invention can be used to facilitate self-reconfiguration and ultimately self-healing wherein a portion of computer controllers within a machinery may be functionally equivalent and therefore providing a level of functional redundancy. However, the diagnostic system 10 can provide a mechanism that allows for this functional redundancy to be utilized on an as-needed basis. For example, referring to FIG. 4, if an essential computer controller fails and causes the machinery to malfunction, the inventive diagnostic system 10 may isolate the faulty controller and thereafter command a second and functionally equivalent controller to assume the role of the faulty controller thus possibly preventing a complete breakdown of the computer controlled machinery M. Thus, the diagnostic system 10 may be operative to facilitate re-segmentation or restructuring of machinery resources to prevent machinery breakdown.

FIG. 5 illustrates a detailed description of the inventive diagnostic process employed by the diagnostic system 10. At 110, the process begins with at least one low level agent collecting data from the computer controlled machinery and sending a first level of diagnostic information to at least one middle agent.

At 120, the at least one middle agent uses the first level of diagnostic information to attempt to identify a failure model by comparing the first level of diagnostic information to reference information stored in the middle agent or to information obtained from at least one high level agent. After a failure model is identified, at 130, the failure model is compared to a reference model obtained from the high level agent to determine if the failure model and reference model coincide.

If the models coincide, the process jumps to 180 wherein the actual failure model characteristics, and the failure causal relationship are learned by the diagnostic system 10. If the models do not coincide, then at 140, the high level agent performs diagnostic tasks to isolate the failure middle agent(s) or middle agent(s) that have recognized an unidentified failure model.

At 150, the at least one middle agent operates to further isolate the failure by performing diagnostic tasks such as reorganization of at least one low level agent to identify a root cause of the failure within a plurality of computer controllers that define a subsystem of the machinery. If the failed computer controller is identified at 160, the process moves to 180 wherein the dynamic failure characteristics and failure causal relationship to other components are learned by the diagnostic system.

If the failed computer controller is not identified, then the process moves to 170 wherein diagnostic information is exchanged between the low level agents and reorganization of the low level agents is repeated at 150 and process root cause identification is performed on a second group of computer controllers at 160 wherein the second group of computer controllers define a second subsystem related to the first subsystem of the machinery.

The 150–170 steps are repeated until fault isolation is accomplished to a computer controller within a subsystem. Thereafter, at 180, the diagnostic system learns the failure model for use in future diagnostic episodes.

The foregoing is illustrative of the functionality of the multi-level model-based diagnostic system for use in a computer controlled machinery, such as an automotive vehicle. However, it is appreciated that the system structure and functionality as described herein can be adapted for use with any computer-controlled machinery, including but not limited to aircraft, marine craft, robotics, communications systems or other product and systems that rely on electrical/electronic units for control and/or monitoring. It is understood that various changes to the essential components and processes of the invention may be resorted to without departing from the spirit of the invention.

We claim:

1. A method of utilizing model based intelligent agents for diagnosing and isolating malfunctions in a computer-controlled machinery comprising the steps of:

disposing a plurality of intelligent agents in the computer controlled machinery, wherein the plurality of agents are disposed in a plurality of hierarchical levels and each intelligent agent has diagnostic capability relative to the hierarchical level the intelligent agent is disposed in, and the plurality of intelligent agents are in data communication with a plurality of computer controllers disposed within the machinery and with each other;

collecting data from the plurality of computer controllers disposed within the computer controlled machinery via at least one intelligent agent disposed in a first hierarchical level, wherein the collected data is analyzed to obtain a first level of diagnostic information and the first level of diagnostic information is communicated to at least one intelligent agent disposed in a second hierarchical level;

employing at least one intelligent agent disposed in the second hierarchical level to perform a second level of diagnostic tasks on the first level of diagnostic information to obtain a second level of diagnostic information, and the second level of diagnostic information is communicated to at least one intelligent agent disposed in a third hierarchical level;

employing the at least one intelligent agent disposed in the third hierarchical level to perform a third level of diagnostic tasks using the second level of diagnostic information, wherein the third level of diagnostic tasks includes analyzing the second level of diagnostic information relative to reference information obtained from a remotely located knowledge database, to accomplish fault isolation within the computer controlled machinery.

2. The method of claim 1 wherein the step of collecting data from at least one intelligent agent disposed in the first hierarchical level further includes the step of collecting and analyzing data to accomplish a first level of fault isolation.

3. The method of claim 2 wherein the step of collecting data from at least one intelligent agent disposed in the second hierarchical level further includes the step of collecting and analyzing data to accomplish a second level of fault isolation, wherein the second level of fault isolation surpasses the first level of fault isolation.

4. The method of claim 3 wherein the step of collecting data from at least one intelligent agent disposed in the third hierarchical level further includes the step of collecting and analyzing data to accomplish a third level of fault isolation, wherein the third level of fault isolation surpasses the second level of fault isolation.

5. The method of claim 1 wherein the intelligent agents are in data communication with each other.

6. The method of claim 1 wherein the intelligent agent includes at least one Application Specific Integrated Circuit (ASIC) disposed within a computer controller.

7. The method of claim 1 wherein said step of performing the second level of diagnostic tasks further includes the step of identifying a failure model relative to the first level of diagnostic information.

8. The method of claim 7 wherein said step of performing the third level of diagnostic tasks further includes the step of analyzing the failure model relative to reference information stored within the at least one intelligent agent disposed in the third hierarchical level.

9. A method of utilizing model based intelligent agents for diagnosing and isolating malfunctions in a computer-controlled machinery comprising the steps of:

disposing a plurality of intelligent agents in the computer controlled machinery, wherein the plurality of agents are disposed in a plurality of hierarchical levels and each intelligent agent has diagnostic capability relative to the hierarchical level the intelligent agent is disposed in, and the plurality of intelligent agents are in data communication with a plurality of computer controllers disposed within the machinery and with each other;

collecting data from the plurality of computer controllers disposed within the computer controlled machinery via at least one intelligent agent disposed in a first hierarchical level, wherein the collected data is analyzed to obtain a first level of diagnostic information and the first level of diagnostic information is communicated to at least one intelligent agent disposed in a second hierarchical level;

employing at least one intelligent agent disposed in the second hierarchical level to perform a second level of diagnostic tasks on the first level of diagnostic information to obtain a second level of diagnostic information that is communicated to at least one intelligent agent disposed in a third hierarchical level, wherein the second level of diagnostic tasks includes reorganizing at least one intelligent agent disposed in the first hierarchical level;

employing the at least one intelligent agent disposed in the third hierarchical level to perform a third level of diagnostic tasks using the second level of diagnostic information, wherein the third level of diagnostic tasks includes analyzing the second level of diagnostic information relative to reference information, to accomplish fault isolation within the computer controlled machinery.

10. The method of claim 9 wherein said step of reorganizing further includes the steps of re-tasking at least one intelligent agent to perform diagnostic tasks on at least one computer controller that the at least one intelligent agent was not previously performing diagnostic tasks on.

11. The method of claim 9 wherein the at least one intelligent agent disposed in the third hierarchical level obtains reference information from a remotely located knowledge database through a wireless communications link.

12. The method of claim 9 further including the step of providing a data link to at least one fault indicator operative to alert a user of the computer controlled machinery that a fault has occurred.

13. A method of utilizing model based intelligent agents for diagnosing and isolating malfunctions in a vehicle comprising the steps of:

disposing a plurality of intelligent agents in the vehicle, wherein the plurality of agents are disposed in a plurality of hierarchical levels and each intelligent agent has diagnostic capability relative to the hierarchical level the intelligent agent is disposed in, and the plurality of intelligent agents are in data communication with a plurality of computer controllers disposed within the vehicle and with each other;

collecting data from the plurality of computer controllers disposed within the vehicle via at least one intelligent agent disposed in a first hierarchical level, wherein the collected data is analyzed to obtain a first level of diagnostic information and the first level of diagnostic information is communicated to at least one intelligent agent disposed in a second hierarchical level;

employing at least one intelligent agent disposed in the second hierarchical level to perform a second level of diagnostic tasks and the second level of diagnostic tasks includes reorganizing the at least one intelligent agent disposed in the first hierarchical level to obtain a second level of diagnostic information, wherein reorganization involves re-tasking at least one intelligent agent to perform diagnostic tasks on at least one computer controller that the at least one intelligent agent was not previously performing diagnostic tasks on, and the second level of diagnostic information is communicated to at least one intelligent agent disposed in a third hierarchical level;

employing the at least one intelligent agent disposed in the third hierarchical level to perform a third level of diagnostic tasks using the second level of diagnostic information, wherein the third level of diagnostic tasks includes analyzing the second level of diagnostic information relative to reference information to accomplish fault isolation within the vehicle.

14. The method of claim 13 wherein the step of collecting data from at least one intelligent agent disposed in the first hierarchical level further includes the step of collecting and analyzing data to accomplish a first level of fault isolation.

15. The method of claim 14 wherein the step of collecting data from at least one intelligent agent disposed in the second hierarchical level further includes the step of collecting and analyzing data to accomplish a second level of fault isolation, wherein the second level of fault isolation surpasses the first level of fault isolation.

16. The method of claim 15 wherein the step of collecting data from at least one intelligent agent disposed in the third hierarchical level further includes the step of collecting and analyzing data to accomplish a third level of fault isolation, wherein the third level of fault isolation surpasses the second level of fault isolation.

17. The method of claim 13 further including the step of providing a data link to at least one fault indicator operative to alert a user of the vehicle that a fault has occurred.

18. The method of claim 13 wherein the at least one intelligent agent disposed in the third hierarchical level obtains reference information from a remotely located knowledge database through a wireless communications link.

* * * * *